United States Patent
Onishi et al.

(10) Patent No.: US 6,353,048 B1
(45) Date of Patent: Mar. 5, 2002

(54) RESIN COMPOSITION AND LAMINATE

(75) Inventors: Hideshi Onishi, Kurashiki; Masashi Sogawa, Yokohama, both of (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/543,575

(22) Filed: Apr. 5, 2000

(30) Foreign Application Priority Data

| Apr. 6, 1999 | (JP) | 11-098648 |
| Apr. 6, 1999 | (JP) | 11-098649 |
| Apr. 6, 1999 | (JP) | 11-098650 |

(51) Int. Cl.⁷ .................................. C08K 5/098
(52) U.S. Cl. ........................................ 524/400
(58) Field of Search ................ 524/400, 459, 524/397, 396, 557, 524, 803; 554/156; 526/702

(56) References Cited

U.S. PATENT DOCUMENTS

| 2,616,924 A | * | 11/1952 | Asseff et al. | ............... | 554/156 |
| 3,147,232 A | * | 9/1964 | Norman et al. | ............. | 524/400 |
| 3,463,751 A | * | 8/1969 | Hasegawa et al. | .......... | 524/400 |
| 3,468,827 A | * | 9/1969 | Hill et al. | .................... | 524/400 |
| 3,474,058 A | * | 10/1969 | Ridgeway et al. | .......... | 524/400 |
| 3,488,306 A | * | 1/1970 | Thormahlen | ................ | 524/400 |
| 3,764,571 A | * | 10/1973 | Jennings et al. | ............. | 524/400 |
| 4,150,003 A | * | 4/1979 | McCain et al. | ............. | 524/394 |
| 4,151,135 A | * | 4/1979 | McClain | ..................... | 524/397 |
| 4,192,793 A | * | 3/1980 | Tanioka et al. | ............. | 524/400 |
| 4,403,068 A | * | 9/1983 | McClain | ..................... | 525/62 |
| 4,826,735 A | * | 5/1989 | Ueki et al. | ................... | 524/394 |
| 4,921,907 A | * | 5/1990 | Negi et al. | .................... | 525/57 |
| 5,118,743 A | | 6/1992 | Yonezu et al. | | |
| 5,360,670 A | | 11/1994 | Yonezu et al. | | |
| 5,399,619 A | * | 3/1995 | Torradas et al. | ............. | 525/57 |
| 5,849,376 A | * | 12/1998 | Oishi et al. | ................. | 428/34.9 |
| 5,888,427 A | * | 3/1999 | Brecker et al. | ............. | 524/399 |

* cited by examiner

*Primary Examiner*—Veronica P. Hoke
(74) *Attorney, Agent, or Firm*—Armstrong, Wester & Hattori, LLP

(57) ABSTRACT

A resin composition comprising a saponified ethylene-vinyl acetate copolymer (A) and a metal soap (B) of the general formula (1) obtained by an acid with a group 2 metal oxide or hydroxide.

$$\alpha MO.M(OOCR)_2 \qquad (1)$$

wherein α represents a numerical value of 0.1~1.0; M represents a bivalent metal belonging to Group 2 of Periodic Table of the Elements; R represents a saturated or unsaturated alkyl group containing 11~29 carbon atoms.

10 Claims, No Drawings

RESIN COMPOSITION AND LAMINATE

FIELD OF THE INVENTION

This invention relates to a resin composition comprising a saponified ethylene-vinyl acetate copolymer (hereinafter referred to briefly as EVOH) and a specified metal soap. The invention further relates to a resin composition comprising, in addition to said copolymer and metal soap, a thermoplastic resin and/or an inorganic filler.

This invention further relates to a laminate comprising such a resin composition.

BACKGROUND OF THE INVENTION

EVOH in general is excellent in clarity, gas-barrier properties, aroma retention, solvent resistance, oil resistance, etc. and, by taking advantage of these characteristics, has been utilized in various forms such as film, sheet, bottle, etc. in the packaging of foods, pharmaceutical products, industrial chemicals, agrochemicals and other articles of commerce.

The film, sheet, bottle, cup, tube, pipe, etc. of EVOH are generally manufactured by the melt-molding technique and the processability (moldability) of the material resin composition is of great importance.

Thus, prevention of streaking in long-run molding, prevention of resin stagnation in the extruder, and purgeability are crucial factors in the quality of finished products.

Addressing itself to improving said processability, JP Kokai S64-64843 discloses a laminate manufactured by using an EVOH having a specified viscosity characteristic, particularly an EVOH treated with a specified metal salt and a specified acid in combination.

JP Kokai H2-99546 describes a resin composition comprising EVOH and a fluorine-containing compound and JP H9-234833 teaches formulating a crosslinking agent in EVOH. The present applicant also proposed to incorporate a hydrotalcite compound in EVOH in JP Kokai H1-308440.

The technology disclosed in JP Kokai S64-64843 referred to above contributes somewhat to improved processability but fails to insure sufficient thermal stability so that the problems of malodor and discoloration under the heat of melt-molding are sometimes encountered. The technology disclosed in JP H2-99546 also contributes to improved processability but the effect is not sufficient and the product appearance is sometimes sacrificed. The technology disclosed in JP H9-234833 is not sufficiently effective in improving processability and, moreover, has been found to be poor in purgeability. The technology disclosed in JP H1-308440 is also found to be insufficient in the prevention of stagnation at the die lip. Thus, the prior art in general has room for improvement.

In applications such as the packaging film, sheet, bottle etc. in the fields of foods, pharmaceutical products, industrial chemicals, and agrochemicals, EVOH is frequently used as blended with thermoplastic or other resins. Thus, in the multi-layer coextrusion of EVOH and thermoplastic resin, a resin blend in lieu of the respective resins is used or a layer of such blend is often interposed between the EVOH and the thermoplastic resin layer. The former technology is intended to attain a synergistic effect in terms of the gas barrier properties of EVOH and the mechanical strength of thermoplastic resin as well as an improvement in drawing characteristic, while the latter technology is intended to improve the interlayer bond strength between the EVOH and thermoplastic resin layers.

However, such polymer blends as mentioned above are not always good in compatibility and tend to undergo phase separation or overreaction in molding to adversely affect the appearance of products.

Therefore, it was proposed to improve said compatibility by formulating an oxide or fatty acid salt of a metal selected from the metals belonging to Groups 1, 2 and 3 of Periodic Table of the Elements in a blend of EVOH and thermoplastic resin [JP Kokai H3-149239, JP Kokai H6-212038].

The above technology is somewhat effective but still unsatisfactory in the compatibility in long-run processing so that a further improvement is required.

Meanwhile, EVOH products are liable to be affected by heat and water, for example in retort sterilization, and be markedly reduced in post-treatment gas barrier properties. To overcome this drawback, JP Kokai H5-193076 proposes a multi-layer container comprising a resin composition layer comprising EVOH and a specified inorganic filler.

Formulating an inorganic powder, such as an inorganic filler powder, in EVOH results in some improvement in said gas barrier properties but in long-run melt-molding, the inorganic particles aggregate to cause poor dispersion, or because of the strong tendency of the resin composition toward thickening with time, the resin is liable to pool in the die region. Therefore, a further improvement is required.

OBJECT OF THE INVENTION

The object of this invention is to reconcile the thermal stability and processability of EVOH, improve the compatibility of EVOH and thermoplastic resin in a polymer blend, and improve the dispersibility of an inorganic filler and anti-stagnation property of a blend comprising EVOH and said inorganic filler in long-run molding.

SUMMARY OF THE INVENTION

The resin composition of this invention is characterized by its comprising a saponified ethylene-vinyl acetate copolymer (A) with an ethylene content of 20~60 mole % and a saponification degree of not less than 90 mole % and a metal soap (B) of the following general formula (1) as obtainable by reacting one or more species of aliphatic monocarboxylic acid containing 12~30 carbon atoms with an oxide or hydroxide of a metal belonging to Group 2 of Periodic Table of the Elements by a dry direct reaction method.

$$\alpha MO.M(OOCR)_2 \quad (1)$$

wherein a represents a numerical value of 0.1~1.0; M represents a bivalent metal belonging to Group 2 of Periodic Table of the Elements; R represents a saturated or unsaturated alkyl group containing 11~29 carbon atoms.

Optionally, the above composition may comprise a thermoplastic resin (C) in addition to said saponified ethylene-vinyl acetate copolymer (A) and metal soap (B).

Furthermore, the composition may comprise an inorganic filler in addition to said saponified ethylene-vinyl acetate copolymer (A) and metal soap

DETAILED DESCRIPTION OF THE INVENTION

EVOH (A) for use in this invention has an ethylene content of 20~60 mole % (preferably 25~55 mole %) and a saponification degree of not less than 90 mole % (preferably not less than 95 mole %). If the ethylene content is less than 20 mole %, high-humidity gas barrier properties and melt moldability will be inadequate. Conversely, if the ethylene content exceeds 60 mole %, no sufficient gas barrier properties will be obtained. Further, if the degree of saponification is less than 90 mole %, gas barrier properties, thermal stability and moisture resistance will be sacrificed.

Within the range not detracting from the effect of the invention, it is possible to use two or more kinds of EVOH varying in chemical structure and/or molecular weight or even add an acid component (acetic acid, phosphoric acid, boric acid, etc.).

The melt index (MI) (210° C., load 2160 g) of said EVOH (A) is not particularly restricted but is preferably 1~100 g/10 minutes (preferably 3~50 g/10 minutes). If said melt index is smaller than said range, high torques will develop within the extruder to make extrusion difficult. On the other hand, if said melt index is larger than said range, the mechanical strength of products will be undesirably low.

The EVOH (A) mentioned above can be obtained by saponifying an ethylene-vinyl acetate copolymer and this ethylene-vinyl acetate copolymer can be prepared by a known polymerization reaction such as solution polymerization, suspension polymerization, emulsion polymerization or the like. The saponification of such an ethylene-vinyl acetate copolymer can also be carried out by a known procedure.

In the practice of the invention, said EVOH (A) may further contain a copolymerizable ethylenically unsaturated monomer component within the range not interfering with the effect of the invention and as such monomer or monomers, there can be mentioned olefins, e.g. propylene, 1-butene, isobutene; unsaturated acids, e.g. acrylic acid, methacrylic acid, crotonic acid, phthalic acid (anhydride), maleic acid (anhydride), itaconic acid (anhydride) or their salts or $C_{1-18}$ mono- or dialkyl esters; acrylamides, e.g. acrylamide, $C_{1-18}$ N-alkylacrylamide, N,N-dimethylacrylamide, 2-acrylamidopropanesulfonic acid or its salts, acrylamidopropyldimethylamine or its acid salts or quaternary salts; methacrylamides, e.g. methacrylamide, $C_{1-18}$ N-alkylmethacrylamide, N,N-dimethylmethacrylamide, 2-methacrylamidopropanesulfonic acid or its salts, methacrylamidopropyldimethylamine or its acid salts or quaternary salts; N-vinylamides, e.g. N-vinylpyrrolidone, N-vinylformamide, N-vinylacetamide; vinyl cyanides, e.g. acrylonitrile, methacrylonitrile; vinyl ethers, e.g. $C_{1-18}$ alkyl vinyl ethers, hydroxyalkyl vinyl ethers, alkoxyalkyl vinyl ethers; vinyl halides, e.g. vinyl chloride, vinylidene chloride, vinyl fluoride, vinylidene fluoride, vinyl bromide; trimethoxyvinylsilane and other vinylsilanes; allyl acetate, allyl chloride, allyl alcohol, dimethylallyl alcohol, trimethyl-(3-acrylamido-3-dimethylpropyl)-ammonium chloride, acrylamido-2-methylpropanesulfonic acid and so on.

The metal soap (B) for use in this invention is represented by the following general formula (1).

$$\alpha MO.M(OOCR)_2 \qquad (1)$$

wherein a represents a numerical value of 0.1~1.0; M represents a bivalent metal belonging to Group 2 of Periodic Table of the Elements; R represents a saturated or unsaturated alkyl group containing 11~29 carbon atoms.

Thus, this metal soap is obtained by reacting one or more species of $C_{12-30}$ aliphatic monocarboxylic acid (B1) with an oxide or hydroxide (B2) of a metal belonging to Group 2 of Periodic Table of the Elements by a dry direct reaction method. Preferred is a metal soap obtained by reacting one or more species of $C_{12-30}$ aliphatic monocarboxylic acid (B1) with an excess of an oxide or hydroxide (B2) of a metal belonging to Group 2 of Periodic Table of the Elements.

The $C_{12-30}$ aliphatic monocarboxylic acid (B1) includes but is not limited to lauric acid, myristic acid, palmitic acid, stearic acid, arachic acid, heptadecanoic acid, behenic acid, oleic acid, elaidic acid, erucic acid, linoleic acid, linolenic acid, ricinolic acid, hydroxystearic acid, montanic acid, isostearic acid, and epoxystearic acid, for which a carboxylic acid other than aliphatic monocarboxylic acids or a dicarboxylic acid may be partially substituted.

The oxide or hydroxide (B2) of a metal belonging to Group 2 of Periodic Table of the Elements includes oxides or hydroxides of alkaline earth metals or zinc group metals, preferably oxides or hydroxides of magnesium, calcium and zinc.

The metal soap (B) can be prepared by reacting (B1) with (B2) by a dry direct reaction method as mentioned above. More particularly, (B1) is heated to 120~140° C. in advance and, then, (B2) is added. After completion of addition, the temperature is increased to 160~180° C. and the mixture is stirred for 20~30 minutes, whereby a transparent metal soap (B) is obtained. In this invention, the metal soap (B) obtained by reacting (B1) with a stoichiometric excess of (B2) is used with advantage. Thus, the metal content of the metal soap (B) is preferably greater than the equimolar amount by 0.1~1.0 mole (more preferably 0.1~0.8 mole). If the excess is less than 0. 1 mole, the effect of the invention may not be fully expressed. On the contrary, if the excess is over 1.0 mole, the unreacted (B2) remains in the metal soap (B). Moreover, the metal soap can be prepared by the wet precipitation method but since this reaction is conducted in water, the reaction temperature is restricted and it is difficult to obtain the metal soap (B) of this invention which contains the metal in a proportion of at least 0.1 mole over the equimolar amount.

While the resin composition of this invention comprises said EVOH (A) and metal soap (B) and the ratio of (A) to (B) is not particularly restricted. However, the formulating amount of metal soap (B) is preferably 0.005~1 weight part (more preferably 0.007~0.5 weight part and most preferably 0.01~0.4 weight part) based on 100 weight parts of EVOH (A) . If the formulating amount is less than 0.005 weight parts, the long-run moldability will be inadequate. Conversely if the formulating amount exceeds 1 weight part, malodor emanation and discoloration will be considerable.

The thermoplastic resin (C) which can be used in this invention is not particularly restricted but includes polyolefin resin, polyamide resin, polyester resin, polystyrene resin, polyvinyl chloride resin, acrylic resin, polyurethane resin, polyvinyl acetate resin, polyacetal resin, polyvinylidene chloride resin, polycarbonate resin, etc.

The polyolefin resin includes homopolymers and copolymers of olefins, such as linear low-density polyethylene (LLDPE) , low-density polyethylene (LDPE) medium-density polyethylene, high-density polyethylene, ethylene-vinyl acetate copolymer, ionomers, nylon-modified ionomers, ethylene-propylene copolymer, ethylene-acrylic ester copolymer, polypropylene (PP) , propylene-α-olefin ($C_{4-20}$ α-olefin) copolymer, polybutene, polypentene, etc., blends of such polymers, and such homo- or copolymers of olefins or polymer blends graft-modified with unsaturated carboxylic acids or esters.

The polyamide resin includes polycapramide (nylon-6), poly-o-aminoheptanoic acid (nylon-7), poly-ω-aminononanoic acid (nylon-9) polyundecamide (nylon-11), polylauryllactam (nylon-12), polyethylenediamineadipamide (nylon-2,6) polytetramethyleneadipamide (nylon-4, 6), polyhexamethyleneadipamide (nylon-6,6), polyhexamethylenesebacamide (nylon-6,10) polyhexamethylenedodecanamide (nylon-6,12), polyoctamethyleneadipamide (nylon-8,6), polydecamethyleneadipamide (nylon-10,8), caprolactam/lauryllactam copolymer (nylon-6/12), caprolactam/ω-aminononanoic acid copolymer (nylon-6/9), caprolactam/hexamethylenediammonium adipate copolymer (nylon-6/6,6), lauryllactam/hexamethylenediammonium adipate copolymer (nylon-12/6,6) ethylenediamineadipamide/hexamethylenediammonium adipate copolymer (nylon-2,6/6,6), caprolactam/hexamethylenediammonium adipate/hexamethylenediammonium sebacate copolymer (nylon-6,6/6,10), ethylenediammonium adipate/hexamethylenediammonium adipate/hexamthylenediammonium sebacate copolymer (nylon-6/6, 6/6,10), polyhexamethyleneisophthalamide, polyhexamethyleneterephthalamide, hexamethyleneisophthalamide/terephthalamide copolymer or modification products of these polyamide resins with an aromatic amine such as methylenebenzylamine, m-xylenediamine or the like, and m-xylylenediammonium adipate.

The polyester resin includes poly(ethylene terephthalate), poly(butylene terephthalate), poly(ethylene terephthalate/isophthalate), poly(ethylene glycol/cyclohexanedimethanol/terephthalate), etc., and further includes copolymers obtainable by copolymerizing such polymers with such comonomers as diols, e.g. ethylene glycol, butylene glycol, cyclohexanedimethanol, neopentyl glycol, pentanediol, etc., or dicarboxylic acids, e.g. isophthalic acid, benzophenonedicarboxylic acid, diphenylsulfonedicarboxylic acid, diphenylmethanedicarboxylic acid, propylenebis (phenylcarboxylic acid), diphenyl oxide-dicarboxylic acid, oxalic acid, malonic acid, succinic acid, glutaric acid, adipic acid, pimelic acid, suberic acid, azelaic acid, sebacic acid, diethylsuccinic acid, etc.

The polystyrene resin includes not only a homopolymer of styrene but also a polystyrene to which butadiene has been graft-polymerized, a styrene-butadiene rubber blend, a styrene-maleic anhydride copolymer, etc.

The polyvinyl chloride resin includes not only homopolymers of vinyl chloride but also copolymers with vinyl acetate, maleic acid derivatives, higher alkyl vinyl ethers, etc.

Among these thermoplastic resins (C), polyolefin resins such as lenear low-density polyethylene (LLDPE), low-density polyethylene (LDPE), medium-density polyethylene, high-density polyethylene, ethylenevinyl acetate copolymers, ionomers, nylon-modified ionomers, ethylene-propylene copolymers, ethyleneacrylic ester copolymers, polypropylene (PP) and modifications of these as derived by grafting of an unsaturated carboxylic acid or an ester thereof, polyamide resins such as polycapramide (nylon-6), polylauryllactam (nylon-12), polyhexamethyleneadipamide (nylon-6,6), caprolactam/lauryllactam copolymer (nylon-6/12), caprolactam/hexamethylenediammonium adipate copolymer (nylon-6/6,6), polyhexamethyleneisophthalamide, polyhexamethyleneterephthalamide, hexamethyleneisophthalamide/terephthalamide copolymer, modification of these polyamide resins as derived by an aromatic amine such as methylenebenzylamine or m-xylenediamine and m-xylylenediammonium adipate, polyester resins such as poly(ethyleneterephthalate), poly(butylene terephthalate) and poly(ethylene naphthalate), polystyrene resins such as styrene homopolymers, butadiene-grafted polystyrene, styrene-butadiene rubber blends and styrene-maleic anhydride copolymers, polyvinyl chloride resins such as vinyl chloride homopolymers and copolymers with vinyl acetate, a maleic acid derivative, a higher alkyl vinyl ether or the like, and other thermoplastic resins such as ethylene-vinyl acetate copolymers, ionomers and modifications thereof are relatively poor in compatibility with EVOH or liable to overreaction. Therefore, the effects of the this invention are significant in cases where these resins are used.

The resin composition of this invention comprises EVOH (A), a metal soap (B) and a thermoplastic resin (C) as mentioned above. The mixing ratio is not particularly restricted but it is preferred that the thermoplastic resin (C) be used in an amount of 5~100 parts by weight (more preferably 10~60 parts by weight, most preferably 20~50 parts by weight) per 100 parts by weight of EVOH (A). When the amount is less than 5 parts by weight, the intended synergistic effects on mechanical strength, for instance, or the improvements in physical properties, for example an improvement in stretchability, will be produced only to an unsatisfactory extent. When, conversely, it is in excess of 100 parts by weight, the gas barrier properties will unfavorably become insufficient. The level of addition of the metal soap (B) is preferably 0.005~1 part by weight (more preferably 0.007~0.5 part by weight, most preferably 0.01~0.4 part by weight) per 100 parts by weight of EVOH (A). At an addition level of less than 0.005 part by weight, the long-run characteristics will be poor. When the level is in excess of 1% by weight, odor emanation and discoloration of moldings will unfavorably become significant in the step of molding.

For obtaining the resin composition of this invention, it suffices that the above (A), (B) and (C) be blended together. The method of blending is not critical but includes, among others, the following:

(1) The method comprising melting and kneading (A) and (B) and then externally adding (B);

(2) The method comprising blending together (A), (B) and (C) all at once and then melting and kneading the mixture;

(3) The method comprising incorporating (B) in (A) and then admixing with (C) by melting and kneading; and (4) The method comprising incorporating (B) in each of (A) and (C) and then melting and kneading both together. The method (1) is judiciously employed, however.

The inorganic filler (D) to be used in the practice of this invention includes, but is not limited to, talc, mica, sericite, glass flakes, silicon oxide, aluminum oxide, zirconium oxide, magnesium oxide, cerium oxide, tungsten oxide, molybdenum oxide and composites of these. The filler (D) may comprise at least one species selected from among those specifically mentioned above. These inorganic fillers preferably have a particle size of 0.1~10 μm, more preferably 0.5~5 μm. When such particle size is less than 0.1 μm, the gas barrier characteristics will be poor. A particle size exceeding 10 μm may cause gel, fish eye formation or like defect in appearance in moldings, hence is unfavorable. Among the inorganic fillers mentioned above, silicon oxide (silicic acid) and silicon oxide-magnesium oxide (magnesium silicate) are preferred from the viewpoint of compatibility with EVOH.

As other inorganic fillers suited for use, there may be mentioned water-swelling clay minerals such as smectite and vermiculite and, further, water-swelling synthetic mica and the like. The smectite mentioned above includes, as specific species thereof, montmorillonite, beidellite, nontronite, saponite, hectorite, sauconite, stevensite and so on. These may be either natural products or synthetic ones. Among them, smectite, in particular montmorillonite, is preferred. Water-swelling fluoromicas, such as Na form $Si_4/F$ mica, Na form taeniolite, Li form taeniolite and Na form hectorite are also preferred.

The swelling capacity of said water-swelling inorganic compound as determined in a solvent mixture of water/alcohol=70/30 (weight ratio) at 20° C. is preferably not less than 30 ml/2 g, more preferably not less than 40 ml/2 g, most preferably not less than 50 ml/2 g. When it is less than 30 ml/2 g, the gas barrier characteristics will unfavorably be poor.

The swelling capacity of a water-swelling inorganic compound can be measured by the standard volumetric testing method established by the Japan Bentonite Industrial Society.

The resin composition of this invention may comprise EVOH (A), a metal soap (B) and an inorganic filler (D), as mentioned above. While it is not critical, the amount of the above filler (D) to be used is preferably 1~100 parts by weight (more preferably 3~80 parts by weight, most preferably 5~60 parts by weight) per 100 parts by weight of EVOH (A). When the amount is less than 1 part by weight, the gas barrier characteristics will be poor, while an amount in excess of 100 parts by weight will unfavorably result in a deterioration in moldability. The level of addition of the metal soap (B) is preferably 0.005~1% by weight (more preferably 0.007~0.5 part by weight, most preferably 0.01~0.4 part by weight) per 100 part by weight of EVOH (A). When such amount is less than 0.005 part by weight, the melt moldability will be low in long-term runs, while an addition level exceeding 1 part by weight will unfavorably result in marked odor emanation and discoloration of moldings in the step of molding.

For obtaining the resin composition of the invention, it is sufficient to blend the above (A) with (B) and (D). The method of blending is not critical but may, for example, be as follows:

(1) the method comprising melt kneading components (A) and (D) and then externally adding component (B);
(2) the method comprising melt kneading all components (A), (B) and (D) all at once;
(3) the method comprising incorporating component (B) in component (A) and then melt kneading the mixture with component (D); or
(4) the method comprising incorporating component (B) in each of components (A) and (D) and then melt kneading both together. The method (1) is preferably employed, however.

In that way, the resin composition of the invention is obtained. It is also possible to incorporate one or more additives selected from among plasticizers, slip agents, antiblocking agents, heat stabilizers, ultraviolet absorbers, antistatic agents, surfactants, colorants, antimicrobial agents, fillers (excluding (D)), lubricants, antioxidants and so forth, or a resin other than the thermoplastic resin (C). In particular, it is effective as well to add a hydrotalcite compound, hindered phenol, hindered amine heat stabilizer and/or the like.

The resin composition of the invention is excellent in heat stability and processability and can be used in the field of moldings, for example in melt molding pellets, films, sheets, containers, fibers, bars or rods, tubes and other various moldings. It is also possible to subject ground products derived therefrom (e.g. in the case of recycling) or the pellets further to melt molding. The main techniques of such melt molding are extrusion molding (e.g. T-die extrusion, inflation extrusion, blow molding, melt spinning, contour extrusion) and injection molding. The melt molding temperature is most often selected within the range of 150~300° C.

While the resin composition of the invention may be used in the form of a single film or sheet, it can be used with advantage in the production of laminates, specifically by overlaying at least one side of a layer of said resin composition with a thermoplastic resin layer or the like to give a laminate.

In producing the above laminate, one or both sides of a layer of said resin composition may be laminated with another substrate or other substrates. The method of lamination includes, among others, the method comprising melt-extruding a thermoplastic resin onto a film or sheet made of said resin composition, the method comprising melt-extruding said resin composition onto a substrate made of a thermoplastic resin or the like, and the method comprising coextruding said resin composition and one or more thermoplastic resins. If necessary, an adhesive resin, such as a modified polyolefin resin, may be caused to intervene between the layers. There may further be mentioned the method comprising dry laminating a film or sheet made of said resin composition with a film or sheet made of another substrate material by means of a well known adhesive or bonding agent such as an organic titanium compound, isocyanate compound, polyester compound or polyurethane compound.

The counterpart resin in the case of coextrusion includes polyolefin resins in a broad sense, for example olefin homopolymers and copolymers such as linear low-density polyethylene, low-density polyethylene, medium-density polyethylene, high-density polyethylene, ethylene-vinyl acetate copolymers, ionomoers, ethylene-propylene copolymers, ethylenemonoacrylic ester copolymers, polypropylene, propylene-α-olefin ($C_4$–$C_{20}$ α-olefin) copolymers, polybutene, polypentene, blends of such polymers, and such homo- or copolymers of olefins or polymer blends graft-modified with unsaturated carboxylic acids or esters, polyesters, polyamides, copolyamides, polyvinyl chloride, polyvinylidene chloride, acrylic resins, polystyrene, vinyl ester resins, polyester elastomers, polyurethane elastomers, chlorinated polyethylene, chlorinated polypropylene, aromatic or aliphatic polyketones, polyalcohols and the like. EVOH may also be coextrudable. Among those mentioned above, polypropylene, polyamides, polyethylenes, ethylene-vinyl acetate copolymers, polystyrene, PET (polyethylene terephthalate) and PEN (polyethylene naphthalate) are preferred from the viewpoint of ease of film coextrusion and/or practical film characteristics (in particular, strength).

Further, in cases where the resin composition of the invention is once molded into a film, sheet or the like and then such a molding is subjected to extrusion coating of another substrate or lamination to a film, sheet or the like made of another substrate material with the aid of an adhesive, any substrate material other than the above thermoplastic resin may also be used (e.g. paper, metal foil, uniaxially or biaxially oriented plastic film or sheet, woven fabric, nonwoven fabric, metal wool, wood).

When a layer of the resin composition of the invention is denoted by a (a1, a2, . . . ) and a layer of another substrate material, for example a thermoplastic resin, is denoted by b (b1, b2, . . . ), the layer constitution of the laminate includes not only a bilayer structure, a/b, but also arbitrary combinations such as b/a/b, a/b/a, a1/a2/b, a/b1/b2 and b2/b1/a/b1/b2/in the case of films, sheets or bottles and, in the case of filaments, the bimetal type comprising a and b and other arbitrary combinations such as the core (a)-sheath (b) type, core (b) sheath (a) type and eccentric core-sheath type.

The laminate may be used as such in any of various forms and shapes or may preferably be subjected to heating and stretching treatment for improving the physical properties thereof. "Heating and stretching treatment", so referred to herein, means the procedure comprising uniformly molding a laminate in the form of film, sheet or parison as heated in a thermally uniform manner into a cup, tray, tube, bottle or film by means of chuck or plug, under application of vacuum and/or compressed air or by blowing. Such stretching may be uniaxial or biaxial and a draw ratio as high as possible results in better physical properties, giving stretched moldings having good gas barrier characteristics, without pinhole formation or cracking, uneven stretching or nonuniform section formation, or delamination.

As regards the method of stretching, high draw ratio stretching may also be employed as selected from among roll, tenter and tubular stretching techniques, stretch blowing and vacuum/compressed air molding techniques, among others. In the case of biaxial stretching, either a simultaneous biaxial stretching mode or a successive biaxial stretching mode may be employed. The stretching temperature is selected within the range of 60~170° C., preferably 80~16° C.

After stretching, it is also preferable to conduct thermal fixation. The thermal fixation can be carried out by known means and heat treatment is performed at 80~170° C., preferably100~160° C. for about2~600 seconds, while maintaining the stretched film in a taut condition.

For use in heat shrink packaging of raw meat, processed meat, cheese and the like, the film after stretching is not subjected to thermal fixation but used as a product film and, after receipt of said raw meat, processed meat, cheese or the like therein, is subjected to heat treatment at 50~130° C., preferably 70~120° C., for about 2~300 seconds, to thereby cause said film to shrink for attaining tight packaging.

The thus-obtained laminate may have an arbitrary form and shape, including, among others, films, sheets, tapes, bottles, pipes, filaments, profile extrusion products and the like. If necessary, the laminate obtained may be subjected to heat treatment, cooling treatment, rolling treatment, printing treatment, dry lamination treatment, solution or melt coating treatment, bag forming, deep drawing , box manufacture, tube manufacture or splitting, for instance.

The film, sheet, container or the like obtained in the above manner is useful as a packaging material for foodstuffs, drugs, industrial chemicals, agrochemicals and so forth.

EFFECTS OF THE INVENTION

The resin composition of the invention, which comprises EVOH and a specific metal soap, is excellent in heat stability and processability (long-run moldability, suppressed stagnation, purgeability), among others.

The resin composition of the invention, which comprises a blend of EVOH and a thermoplastic resin and further a specific metal soap, is excellent in compatibility between EVOH and the thermoplastic resin, hence good moldability can be attained for a long period of time.

The resin composition of the invention, which comprises a blend of EVOH and an inorganic filler and further a specific metal soap, is excellent in dispersibility of the inorganic filler and prevention of stagnation of the resin composition in long-run molding.

Therefore, the moldings and laminates produced by using the resin composition of this invention are very useful in the fields of films, sheets, tubes, bags, containers and the like for foodstuffs, drugs, agrochemicals and industrial chemicals, among others.

EXAMPLES

The following examples are further illustrative but by no means limitative of this invention. In the examples, all parts are by weight.

Example 1

[Production of metal soap (B)]

Stearic acid (NV=2200), 100 g, was heated to 130° C., and 16.76 g of zinc oxide was then added gradually with constant stirring. The temperature was increased to 150° C. and the mixture was further stirred for 20 minutes to give a transparent basic zinc stearate (B) with a total zinc content of 11.86 weight %, a melting point of 130° C., and a zinc oxide content of 0.15 mole, which had the formula 0.15 ZnO.Zn $(C_{17}H_{35}COO)_2$. For reference, the normal salt zinc stearate of the formula Zn $(C_{17}H_{35}COO)_2$ as prepared by using an equimolar amount of zinc oxide with respect to the NV of said stearic acid had a zinc content of 10.47 weight % and a melting point of 1230° C.

In 100 parts of pellets of EVOH (A) with an ethylene content of 35 mole %, a saponification degree of 99.7 mole % and a melt index (MI) value of 10 g/10 min (210° C., load 2160 g) was formulated 0.01 part of the basic zinc stearate (B) prepared above. The mixture was repelletized with a 30 mm (dia.) twin-screw extruder (L/D=28) to provide a resin composition of this invention.

The thermal stability and processability (long-run moldability, anti-stagnation property, purgeability) were evaluated as follows. [Thermal stability; determination of weight loss]

Using 3~5 mg of the resin composition as a sample and a TGA (thermogravimetric analyzer; Rigaku Denki TG-DTA TG8120), the weight loss (%) was determined in a nitrogen atmosphere, with the temperature increased at a rate of 200° C./min., maintained at 210° C. for 1 min., and then held at 250° C. for 60 minutes, and the result was evaluated as follows.

○ - - - weight loss<10%

× - - - weight loss≧10%

[Long-run processability; observation of streaking]

Using the resin composition, a monolayer film was manufactured by 8-hour continuous extrusion under the following conditions and the evaluation was made as follows.

[Film-forming conditions; single-screw extruder]

| | |
|---|---|
| Screw type | Full-flight type |
| Screw in. dia. | 40 mm |
| L/D | 28 |
| Screw compression ratio | 3.0 |
| Screw speed | 20 rpm |
| T-die | Coat hanger type |
| Die lip clearance | 0.25 mm |
| Die width | 600 mm |
| Extrusion temperature | C1: 180° C.   H: 240° C. |
| | C2: 230° C.   D: 240° C. |
| | C3: 240° C. |
| | C4: 240° C. |

The film-forming operation was continued for 8 consecutive hours and the moldability was evaluated as follows.

○ - - - No streaking observed even at hour 8

Δ - - - Streaking observed during hour 4 hour 8

× - - - Streaking observed before hour 4

[Anti-stagnation effect; observation of die lip]

After the above film-forming operation, the extruder T-die assembly was disconnected and the die lip was visually examined for any adherent matter (a colored deposit formed by thermal degradation) and the result was evaluated as follows.

○ - - - No colored deposit is observed

Δ - - - A colored deposit is locally observed at the die lip

× - - - A colored deposit is observed all over the die lip

[Purgeability; observation of gels]

The resin composition was subjected to 8-hour continuous extrusion with a single-screw extruder in the same manner as above. The temperature control was suspended (air cooling) for 15 hours and after the die temperature had dropped to room temperature, reheating was performed at the same temperature setting (said extrusion temperature) for 2 hours and the film-forming operation was carried out again using the same resin composition. The number of gels 0.2 mm or larger in diameter per unit area (10 cm×10 cm) of the film was counted and the result was evaluated as follows.

○ - - - The number of gels decreases to $\leq 10$ in less than 10 minutes after restarting Δ - - - The number of gels decreases to $\leq 10$ in less than 15 minutes after restarting × - - - It takes not less than 15 minutes after restarting for the number of gels to decrease to $\leq 10$.

Example 2

[Production of metal soap (B)]

After 100 g of 12-hydroxystearic acid (NV=179) was heated to 120° C., 10.06 g of magnesium oxide was added gradually with stirring. After addition of the total amount, the temperature was increased to 165° C. and the reaction mixture was further stirred for 20 minutes to complete the reaction. Thus obtained was a basic magnesium 12-hydroxystearate (B) with a total magnesium content of 5.8 weight %, a melting point of 228° C., and a magnesium oxide content of 0.44 mole, which had the formula 0.44 MgO.Mg $(C_6H_{13}.CH(OH).C_{10}H_{20}.COO)_2$. For reference, the normal salt magnesium 12-hydroxy-stearate of the formula Mg $(C_6H_{13}.CH(OH).C_{10}H_{20}.COO)_2$ as synthesized by using an equimolar amount of magnesium oxide based on the NV of said 12-hydroxystearic acid had a magnesium content of 3.7 weight % and a melting point of 143° C.

Except that the metal soap (B) obtained above was used, a resin composition was prepared and evaluated in otherwise the same manner as in Example 1.

Example 3

Except that the formulating amount of metal salt (B) was changed to 0.006 part, a resin composition was prepared and evaluated in otherwise the same manner as in Example 1.

Example 4

Except that the formulating amount of metal salt (B) was changed to 0.1 part, a resin composition was prepared and evaluated in otherwise the same manner as in Example 1.

Example 5

Except that an EVOH with an ethylene content of 45 mole %, a saponification degree of 99.7 mole %, and an MI value of 10 g/10 min (210° C., load 2160 g) was used as EVOH (A), a resin composition was prepared and evaluated in otherwise the same manner as in Example1.

Example 6

Using a 3-variety, 5-layer coextrusion T-die film-forming equipment, the resin composition obtained in Example 1, a thermoplastic resin [polypropylene, MI (JIS K6758)=2.4 g/10 min], an adhesive resin [modified polyolefin resin, Mitsubishi Chemical's MODIC-AP P523, MI (JIS K6758)= 2.5 g/10 min] were coextruded to provide a laminate film of the structure: thermoplastic resin layer (20 μm)/adhesive resin layer (5 μm)/resin composition layer (5 μm)/adhesive resin layer (5 μm)/thermoplastic resin layer (25 μm). For this laminate, the long-run processability and purgeability were evaluated.

[Film-forming conditions for the resin composition of Example 1, single-screw extruder]

| Screw in. dia. | 32 mm | |
|---|---|---|
| L/D | 28 | |
| Extrusion temperature | C1: 180° C. | H: 240° C. |
| | C2: 230° C. | |
| | C3: 240° C. | |
| | C4: 240° C. | |

[Film-forming conditions for thermoplastic resin, single-screw extruder]

| Screw in. dia. | 40 mm | |
|---|---|---|
| L/D | 28 | |
| Extrusion temperature | C1: 180° C. | H: 240° C. |
| | C2: 220° C. | |
| | C3: 240° C. | |
| | C4: 240° C. | |

[Film-forming conditions for adhesive resin, single-screw extruder]

| Screw in. dia. | 32 mm | |
|---|---|---|
| L/D | 24 | |
| Extrusion temperature | C1: 180° C. | H: 240° C. |
| | C2: 220° C. | |
| | C3: 240° C. | |

[Die parameter settings]

| T-die | Feed block 5-layer die |
|---|---|
| Die width | 450 mm |
| Temperature setting | 240° C. |

Example 7

Except that the resin composition prepared in Example 2 was used, a laminate was prepared and evaluated in otherwise the same manner as in Example 6.

Comparative Example 1

Except that the metal soap (B) was not formulated, a resin composition was prepared and evaluated in otherwise the same manner as in Example 1.

Comparative Example 2

Except that magnesium stearate was used in lieu of metal soap (B), a resin composition was prepared and evaluated in otherwise the same manner as in Example 1

The results of evaluations made in Examples and Comparative Examples are summarized in Table 1.

TABLE 1

|  | Thermal stability* | Long-run moldability | Anti-stagnation property | Purgeability |
|---|---|---|---|---|
| Example 1 | o (3.2%) | o | o | o |
| Example 2 | o (2.8%) | o | o | o |
| Example 3 | o (2.1%) | o | o | o |
| Example 4 | o (8.2%) | o | o | o |
| Example 5 | o (1.7%) | o | o | o |
| Example 6 | — | o | — | o |
| Example 7 | — | o | — | o |
| Compar. Example 1 | o (1.7%) | x | x | x |
| Compar. Example 2 | x (13.4%) | Δ | Δ | o |

*: The value in parentheses is the measured weight loss (%)

Example 8

In 100 parts of pellets of EVOH (A) with an ethylene content of 35 mole %, a saponification degree of 99.7 mole % and an MI value of 10 g/min (210° C., load 2160 g) were formulated 10 parts of LLDPE (C) pellets with an MI value of 1.9 g/10 min (JIS K6760), a density of 0.924 g/cm$^3$ and a melting point of 124° C. and 0.01 part of the basic zinc stearate (B) obtained in Example 1, and the mixture was repelletized with a 30 mm (dia.) twin-screw extruder (L/D=28) to provide a resin composition of this invention.

The compatibility of the resin composition thus obtained in long-run molding was evaluated as follows.

(Compatibility in long-run molding)

Using a single-screw extruder under the same conditions as in Example 1, the resin composition thus obtained was subjected to 12-hour continuous extrusion. Then, the temperature control was suspended (air cooling) for 15 hours and after the die temperature had dropped to room temperature, 2 hours of reheating was performed at the same temperature setting (the under-mentioned extrusion temperature). Then, using the same resin composition, a film-forming session was carried out again.

The number of gels 0.2 mm or lager in diameter per unit area (10 cm×10 cm) of the resulting film was counted and evaluated as follows. A large number of gels was observed immediately after restarting and, therefore, beginning 5 minutes after restarting, the film was sampled at 5-minute intervals to find the time till the number of gels had decreased to not more than 10.

- o - - - The number of gels decreases to ≦10 in less than 30 minutes after restarting
- Δ - - - The number of gels decreases to ≦10 in 30~60 minutes after restarting
- x - - - It takes not less 60 minutes after restarting for the number of gels to decrease to ≦10.

Example 9

Except that the basic magnesium 12-hydroxystearate obtained in Example 2 was used as metal soap (B), a resin composition was prepared and evaluated in otherwise the same manner as in Example 8.

Example 10

Except that 15 parts of PP (C) pellets with an MI value of 1.9 g/10 min. (JIS K6758) and a density of 0.90 g/cm$^3$ was used in lieu of LLDPE (C), a resin composition was prepared and evaluated in otherwise the same manner as in Example 8.

Example 11

Except that 10 parts of noncrystalline polyamide pellets (DuPont, Sealar PA 3426) with an MI value of 3.5 g/10 min (230° C., load 2160 g) and a density of 1.18 g/cm$^3$ was used in lieu of LLDPE (C), a resin composition was prepared and evaluated in otherwise the same manner as in Example 9.

Example 12

Except that 5 parts of nylon-6 pellets (Mitsubishi Engineering Plastics, Novamide 1022C6) with a density of 1.14 g/cm$^3$ and a melting point of 215° C. (C) was used in lieu of LLDPE (C), the procedure of Example 8 was repeated to prepare a resin composition. This composition was evaluated in the same manner as in Example 8.

Example 13

Except that 10 parts of nylon-modified ionomer pellets (C) with an MI value of 1.3 g/10 min (210° C., load 2160 g), a density of 1.00 g/cm$^3$, and melting points of 85 and 197° C. was used in lieu of LLDPE (C), the procedure of Example 8 was prepared to prepare a resin composition. This composition was evaluated as in Example 8.

Example 14

Except that 10 parts of pellets of an ethylene-vinyl acetate copolymer (C) with an MI value of 1.5 g/10 min (190° C., load 2160 g), a vinyl acetate content of 8.0% and a melting point of 990° C. was used in lieu of LLDPE (C), the procedure of Example 9 was repeated to prepare a resin composition. This composition was evaluated as in Example 9.

Example 15

The procedure of Example 8 was repeated except that the formulating amount of metal soap (B) was set to 0.1 part and the resulting resin composition was similarly evaluated.

Example 16

The procedure of Example 9 was repeated except that the formulating amount of metal soap (B) was set to 0.1 part and the resulting resin composition was similarly evaluated.

Example 17

Except that an EVOH with an ethylene content of 45 mole %, a saponification degree of 99.7 mole % and an MI value of 10 g/10 min (210° C., load 2160 g) was used as EVOH (A), the procedure of Example 8 was otherwise repeated to provide a resin composition. This composition was evaluated in the same manner as in Example 8.

Example 18

Using a 3-variety/5-layer coextrusion T-die film-forming equipment, the resin composition obtained in Example 8, a thermoplastic resin [polypropylene, MI (JIS K6758)=2.4 g/10 min] and an adhesive resin [modified polyolefin resin, Mitsubishi Chemical's MODIC-AP P523, MI (JIS K6758)=

2.5 g/10 min] were coextruded to provide a laminate film of the structure: thermoplastic resin layer (20 μm) /adhesive resin layer (5 μm)/resin composition layer (5 μm)/adhesive resin layer (5 μm)/thermoplastic resin layer (25 μm). For this laminate, the long-run molding compatibility was evaluated.

Example 19

Except that the resin composition obtained in Example 9 was employed, the procedure of Example 13 was otherwise repeated to provide a laminate and this laminate was evaluated in the same manner as above.

Comparative Example 3

Except that the formulation of metal soap (B) was omitted, the procedure of Example 8 was otherwise repeated to provide a resin composition and this composition was evaluated in the same manner as above.

Comparative Example 4

Except that magnesium stearate was used in lieu of metal soap (B), the procedure of Example 8 was otherwise repeated to provide a resin composition and this composition was evaluated in the same manner as above.

The results of evaluations made in Examples and Comparative Examples are summarized in Table 2.

TABLE 2

|  | Long-run molding compatibility |
| --- | --- |
| Example 8 | ○ |
| Example 9 | ○ |
| Example 10 | ○ |
| Example 11 | Δ |
| Example 12 | ○ |
| Example 13 | Δ |
| Example 14 | Δ |
| Example 15 | ○ |
| Example 16 | ○ |
| Example 17 | ○ |
| Example 18 | ○ |
| Example 19 | ○ |
| Compar. Example 3 | x |
| Compar. Example 4 | x |

Example 20

In 100 parts of pellets of an EVOH (A) with an ethylene content of 35 mole %, a saponification degree of 99.7 mole % and an MI value of 10 g/10 min (210° C., load 2160 g) were formulated 0.01 part of talc (Hayashi Kasei, Micron White #5000S, mean particle diameter 2.8 μm) (D) and 0.01 part of the basic zinc stearate obtained in Example 1, and the mixture was repelletized with a 30 mm (dia.) twin-screw extruder (L/D=28) to provide a resin composition of the invention.

The processability (dispersibility of the inorganic filler and anti-stagnation property of the resin composition in long-run molding) of the resin composition was evaluated as follows. [Dispersibility of inorganic filler; observation of film]

The resin composition was molded into a 100 μm-thick single-layer film under the following conditions.

[Film-forming conditions, single-screw extruder]

| Screw type | Full-flight type | |
| --- | --- | --- |
| Screw in. dia. | 40 mm | |
| L/D | 28 | |
| Screw compression ratio | 3.0 | |
| Screw speed | 60 rpm | |
| T-die | Coat hanger type | |
| Die lip clearance | 0.25 mm | |
| Die width | 600 mm | |
| Extrusion temperature | C1: 180° C. | H: 240° C. |
|  | C2: 230° C. | D: 240° C. |
|  | C3: 240° C. | |
|  | C4: 240° C. | |

The above film-forming operation was continued for 8 consecutive hours and the film was sampled at 1-hour intervals from the start of operation. The cross-section of each film sample was examined under the light microscope for the aggregation of inorganic filler particles and the result was rated as follows.

○ - - - No increase in the aggregation of inorganic filler particles even after 8 hours Δ - - - An increase in the aggregation of inorganic filler particles in 4~8 hours x - - - An increase in the aggregation of inorganic filler particles within 4 hours

[Anti-stagnation property; observation of die lip]

After the above film-forming operation, the extruder T-die assembly was disconnected and the die lip was visually examined for an adherent matter (a colored deposit due to thermal degradation). The result was evaluated as follows.

○ - - - No colored deposit is found

Δ - - - A colored deposit is locally found at the die lip x - - - A colored deposit is found all over the die lip Example 21

Using the basic magnesium 12-hydroxystearate obtained in Example 2 as metal soap (B), the procedure of Example 20 was otherwise repeated to prepare a resin composition. The composition was similarly evaluated.

Example 22

Using 0.04 part of amorphous silica (Fuji Silicia Chemical's Silicia 310, mean particle diameter 1.4 μm) (B) in lieu of talc (D), the procedure of Example 20 was otherwise repeated to prepare a resin composition. This composition was evaluated in the same manner as above.

Example 23

Using 0.02 part of calcium carbonate (Shiraishi Kogyo's Whiton P-10, mean particle diameter 2.5 μm (D) in lieu of talc (D), the procedure of Example 21 was otherwise repeated to prepare a resin composition. This composition was evaluated in the same manner as above.

Example 24

Using 0.04 par t of native montmorillonite [swellability in water:isopropyl alcohol (70/30, w/w)=67 ml/2 g] (D) in lieu of talc (D) the procedure of Example 20 was otherwise repeated to prepare a resin composition. This composition was evaluated in the same manner as above.

Example 25

Using an EVOH with an ethylene content of 45 mole %, a saponification degree of 99.7 mole % and an MI value of 10 g/10 min (210° C., load 2160 g) as EVOH (A), the procedure of Example 20 was otherwise repeated to prepare a resion composition. This composition was similarly evaluated.

Example 26

Using a 3-variety, 5-layer coextrusion T-die film-forming equipment, the resin composition obtained in Example 1, a thermoplastic resin [polypropylene, MI (JIS K6758)=2.4 g/10 min], and an adhesive resin [modified polyolefin resin, Mitsubishi Chemical's MODIC-AP P523, MI (JIS K6758)= 2.5 g/10 min] were coextruded to provide a laminate sheet of the structure: thermoplastic resin layer (20 μm) /adhesive resin layer (5 μm)/resin composition layer (5 μm)/adhesive resin layer (5 μm)/thermoplastic resin layer (25 μm). For this laminate, only the dispersibility of inorganic filler in 8-hour continuous molding was evaluated.

Comparative Example 5

Except that the formulation of metal soap (B) was omitted, the procedure of Example 20 was otherwise repeated to provide a resin composition. This composition was similarly evaluated.

Comparative Example 6

Except that magnesium stearate was used in lieu of metal soap (B), the procedure of Example 20 was otherwise repeated to provide a resin composition. This composition was similarly evaluated.

The results of evaluations made in Examples and Comparative Examples are summarized in Table 3.

TABLE 3

|  | Dispersibility of inorganic filler | Anti-stagnation property |
| --- | --- | --- |
| Example 20 | ○ | ○ |
| Example 21 | ○ | ○ |
| Example 22 | ○ | ○ |
| Example 23 | ○ | ○ |
| Example 24 | Δ | Δ |
| Example 25 | ○ | ○ |
| Example 26 | ○ | — |
| Compar. Example 5 | x | x |
| Compar. Example 6 | x | Δ |

What is claimed is:

1. A resin composition comprising a saponified ethylene-vinyl acetate copolymer (A) with an ethylene content of 20~60 mole % and a saponification degree of not less than 90 mole % and a metal soap (B) of the following general formula (1) as obtainable by reacting one or more species of aliphatic monocarboxylic acid containing 12~30 carbon atoms with an oxide or hydroxide of a metal belonging to Group 2 of Periodic Table of the Elements by a dry direct reaction method.

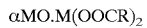 (1)

wherein α represents a numerical value of 0.1~1.0; M represents a bivalent metal belonging to Group 2 of Periodic Table of the Elements; R represents a saturated or unsaturated alkyl group containing 11~29 carbon atoms.

2. A resin composition as claimed in claim 1 wherein the formulating amount of said metal soap (B) is 0.005~1 weight part based on 100 weight parts of said saponified ethylene-vinyl acetate copolymer (A).

3. A resin composition as claimed in claim 1 which, in addition to said saponified ethylene-vinyl acetate copolymer (A) and said metal soap (B) further comprises a thermoplastic resin (C).

4. A resin composition as claimed in claim 3 wherein the formulating amount of said thermoplastic resin (C) is 5~100 weight parts based on 100 weight parts of said saponified ethylene-vinyl acetate copolymer (A).

5. A resin composition as claimed in claim 3 wherein said thermoplastic resin (C) is at least one member selected from the group consisting of polyolefin resin, polyester resin and polyamide resin.

6. A resin composition as claimed in claim 1 which, in addition to said saponified ethylene-vinyl acetate copolymer (A) and said metal soap (B), further comprises an inorganic filler (D).

7. A resin composition as claimed in claim 6 wherein the formulating amount of said inorganic filler (D) is 1~100 weight parts based on 100 weight parts of said saponified ethylene-vinyl acetate copolymer (A).

8. A laminate comprising at least one layer containing a resin composition comprising a saponified ethylene-vinyl acetate copolymer (A) with an ethylene content of 20~60 mole % and a saponification degree of not less than 90 mole % and a metal soap (B) of the following general formula (1) as obtainable by reacting one or more species of aliphatic monocarboxylic acid containing 12~30 carbon atoms with an oxide or hydroxide of a metal belonging to Group 2 of Periodic Table of the Elements by a dry direct reaction method.

 (1)

wherein a represents a numerical value of 0.1~1.0; M represents a bivalent metal belonging to Group 2 of Periodic Table of the Elements; R represents a saturated or unsaturated alkyl group containing 11~29 carbon atoms.

9. The resin composition of claim 1, said dry direct reaction method comprising heating the aliphatic carboxylic acid to 120 to 140° C., then adding the oxide or hydroxide of the metal belonging to Group 2,then heating at 160 to 180° C.

10. The resin composition of claim 8, said dry direct reaction method comprising heating the aliphatic carboxylic acid to 120 to 140° C., then adding the oxide or hydroxide of the metal belonging to Group 2,then heating at 160 to 180° C.

* * * * *